April 10, 1945.   S. SENSIPER ET AL   2,373,145
DELAYED TRIGGER CIRCUIT
Filed March 30, 1943   2 Sheets-Sheet 1

INVENTORS
SAMUEL SENSIPER
GILMAN B. ANDREWS
BY
ATTORNEY itented Apr. 10, 1945

2,373,145

UNITED STATES PATENT OFFICE 2,373,145

DELAYED TRIGGER CIRCUIT

Samuel Sensiper, Garden City, and Gilman B. Andrews, Hempstead, N. Y., assignors to Sperry Gyroscope Company, Inc., a corporation of New York Application March 30, 1943, Serial No. 481,168

10 Claims. (Cl. 171—95)

This invention relates broadly to delayed trigger circuits and more particularly to circuits associated with cathode-ray tube indicating devices providing for delaying registration of the pulse under examination with respect to the triggering of the sweep.

In the examination of repetitive pulse phenomena by means of an oscilloscope, it is common practice to impress the wave under study on the vertical plates of the instrument's cathode-ray tube and to "sweep" it across the screen with a sweep wave, the generation of which is initiated by a portion of the wave to be examined. With the sweep triggered thusly, the leading portion of the studied wave is not visible on the tube screen due to the delay between the rise of a pulse and the starting of the sweep.

With the usual synchronized sweep system, this delay is in the order of two-tenths of a microsecond, and, where the rise of the wave under study is in the order of one-half of a micro-second, it is readily apparent that the lost portion of the wave is appreciable.

If the full wave is to be examined, therefore, it is necessary to delay the triggering of the pulse generator for a fraction of a micro-second after the sweep generator is triggered. It is with circuits which provide for such delay that the instant invention deals.

And it is accordingly an object of the invention to control the initiation of the sweep wave of an oscilloscope in timed relationship with pulse phenomena which are to be observed.

Another object of the invention is to provide a pulse generator trigger circuit which may be variably delayed until after the triggering of a sweep wave.

A further purpose of the invention is to provide separate means for delaying the triggering of a pulse generator to come after the triggering of a sweep wave in order that full wave indication of the pulse may be obtained on the tube screen of an oscilloscope.

It is also an object of the invention to provide a delayed trigger circuit having an unsymmetrical multivibrator, a triggering multivibrator and a blocking oscillator arranged in such manner that the output of the unsymmetrical multivibrator may be used to trigger the sweep generator and the triggering multivibrator, the variable output of the latter in turn being used to trigger the blocking oscillator so that the pulse produced by it may occur before or after the triggering of the sweep generator.

In carrying out the invention, in a preferred embodiment thereof, two multivibrators and a blocking oscillator are used. A sweep generator is triggered by the trailing edge of a square wave from the first, or unsymmetrical, multivibrator and the leading edge of the same wave is used to trigger the second multivibrator which also generates a square wave. The trailing edge of this last-mentioned wave is then used to trigger the blocking oscillator, and, under the condition which provides for varying the on and off time of the second, or triggering multivibrator, it is possible to trigger the blocking oscillator so that the pulse generated by it will occur before or after the triggering of the sweep wave.

In the accompanying drawings, which form a part of the specification,

Like numerals have been used throughout the drawings to designate like parts.

Figure 1:
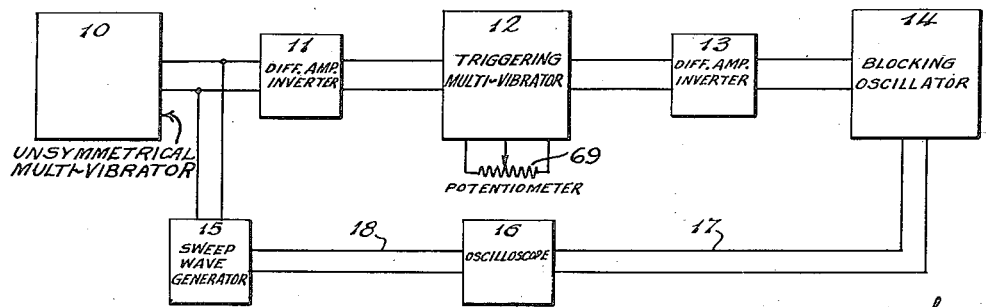
Fig. 1 is a block diagram of a preferred embodiment of the invention.
Figure 2:
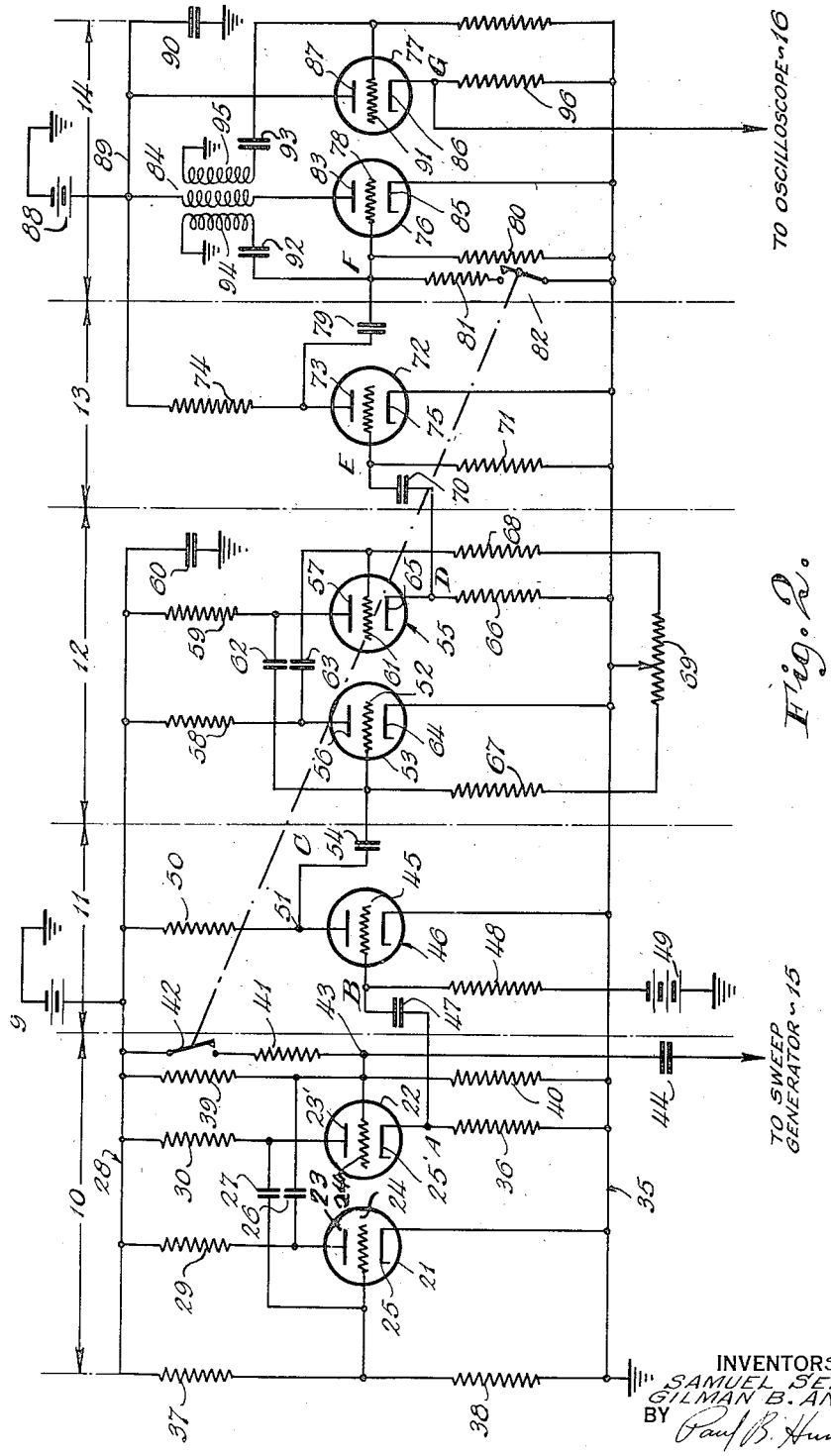
Fig. 2 is a detailed circuit diagram of the apparatus shown in Fig. 1.

With reference to Figs. 1 and 2 which are illustrative of an embodiment of this invention, a multivibrator 10, comprising two electronic discharge devices 21 and 22, which may be of the triode type, is shown with its tubes connected as an unsymmetrical positive grid multivibrator. The anode 23 of tube 21 is coupled to the grid 24' of tube 22 through the capacitor 26 and conversely, the anode 23' of tube 22 is coupled to the grid 24 of the tube 21 through the capacitor 27. Anodes 23 and 23' of tubes 21 and 22 are connected to the common bus 28 through the respective resistances 29 and 30. The cathode 25 of tube 21 is connected directly to a common ground 35 and the cathode of tube 22 is connected thereto through the cathode resistor 36. The respective grids of both tubes are connected to voltage dividers comprising the resistors 37, 38, 39 and 40. Resistor 39 has connected in parallel therewith, resistor 41 through the switch 42.

The output of multivibrator 10 is taken from the terminal point 43 and delivered to a sweep generator 15 through the capacitor 44. Also, the output is taken from the cathode of tube 22 at the point A and delivered to the grid 45 of the differentiating, amplifying and inverting stage 11 through the coupling elements 47 and 48. Negative bias is applied to grid 45 from the negative energy source 49. The anode of tube 46 is connected to positive energy source 9 through the resistor 50, and its cathode directly to the common ground 35.

The output of this last described stage is taken from the connection 51 and delivered to the grid 52 of the first element 53 of the trigger multivibrator circuit 12 through a capacitor 54. The tubes 53 and 55, comprising the trigger multivibrator stage, have their respective anodes 56 and 57 connected through resistors 58 and 59 to positive electrical energy source by common bus 28 coupled to ground through the capacitor 60 as shown. Grids 52 and 61 of these tubes are cross coupled with anodes 56 and 57 through the capacitors 62 and 63. Cathode 64 of tube 53 is connected directly to ground and cathode 65 of tube 55 is connected to ground through the cathode resistor 66. The grids of both tubes 53 and 55 are connected in series through the resistors 67 and 68 and the potentiometer 69.

The output of multivibrator 12 is taken from the cathode of tube 55 at point D and delivered to the differentiating, amplifying and inverting stage 13 through the coupling elements 70 and 71. The amplifying element 72 of this stage which may be of the triode type, has its anode 73 connected to positive energy source 88 through the resistor 74 and its cathode 75 connected directly to ground as shown.

The output of stage 13 is in turn impressed upon the initial element of the blocking oscillator 14 comprising the electronic discharge devices 76 and 77, said output being received by the grid 78 of tube 76 through the coupling elements 79 and 80. Resistor 80 has connected in parallel therewith a resistance 81 which is grounded through the switch 82. The anode 83 of tube 76 is connected to positive electrical energy source through the inductance 84. Cathode 85 of tube 76 is grounded directly while the cathode 86 of tube 77 is grounded through the cathode resistor 96. Anode 87 of tube 77 is connected to positive electrical energy source 88 through the common bus 89, which is coupled to ground through the capacitor 90. The respective grids 78 and 91 of tubes 76 and 77 are coupled to ground through the respective capacitors 92 and 93 and inductances 94 and 95 which are inductively linked with the common inductance 84. The output of the blocking oscillator is taken from the cathode of tube 77 at G and delivered to the signal receiving circuit of the oscilloscope 16 through the conductors 17, Fig. 1. The wires 17 may be connected to either of the oscilloscope tube's deflecting circuits, depending upon the indication desired.

Figures 3, 4:
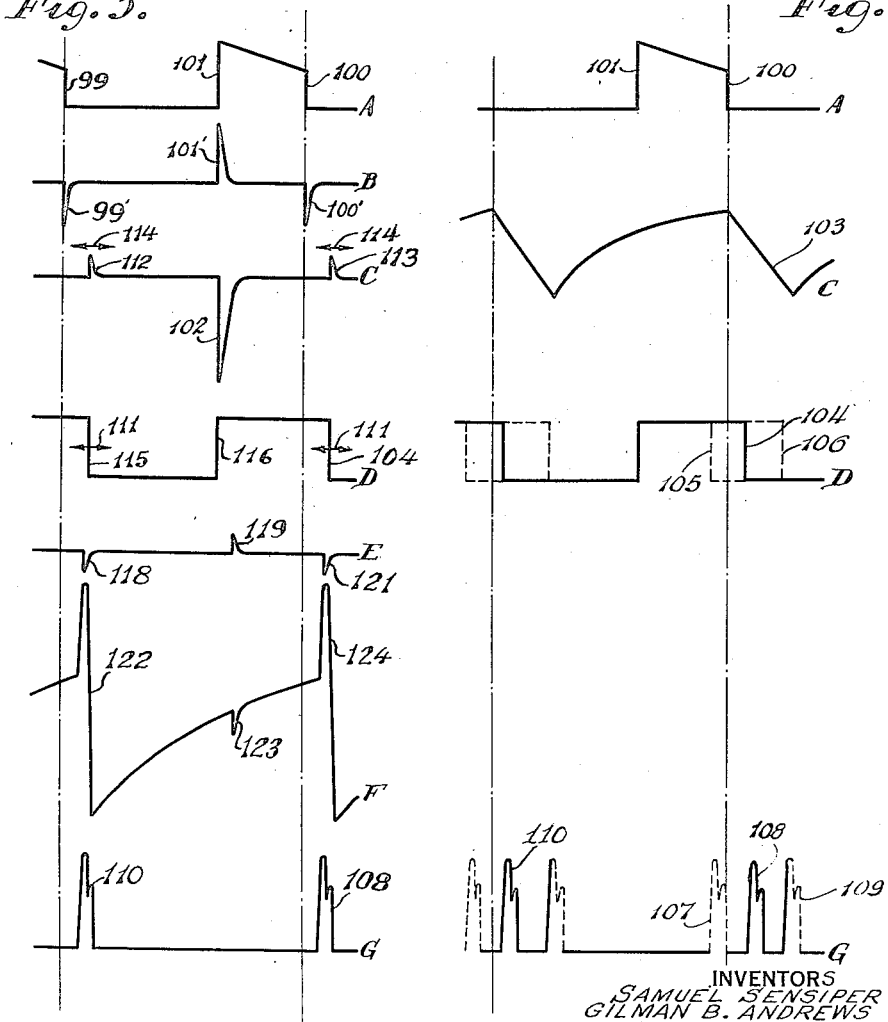
Fig. 3 is a graphical representation of the voltage variations within the circuit at the various points indicated.
Fig. 4 is a graphical representation of the output of the blocking oscillator with respect to the sweep wave.

The operation of the circuit is best exemplified by reference to Fig. 3, which shows voltage variations within the circuit at points indicated as A, B, C, D, E, F and G, in Fig. 2.

The unsymmetrical multivibrator 10 generates a voltage of the squared wave form shown at A in Fig. 3. The trailing edge 100 is used to trigger the sweep generator 15, the gate being taken from the circuit terminal 48. The leading edge 101 of the same wave is differentiated, amplified and inverted at stage 11, as shown by curves B and C. The negative discontinuity 102 of wave C is then employed to trigger the triggering multivibrator 12 which produces a squared wave D. The on and off time of the triggering multivibrator is controlled through variations in the potentiometer 69 in such a manner that the trailing edge of the pulse produced by it may be varied by advancing or retarding the same in point of time as shown at D in Fig. 4 by the two-way arrows 111.

In this manner multivibrator 10 is made to operate as a variable width gate generator by advancing or retarding the trailing edge 104 of the voltage wave D (Fig. 3). The duration of that portion of the voltage between trailing edge 104 and the leading edge 116, which part is commonly termed in the art as a "gate," may be varied to form a variable width gate. It is to be noted here that the natural frequency of the triggering multivibrator is not affected by changes in resistance 69, the latter being effective only to control the on and off time of the multivibrator 12.

It should also be pointed out that, while the pulses 99', 100' and 101' of the voltage B are derived from the respective discontinuities 99, 100 and 101 of the voltage A, pulses 112 and 113 of wave C are not produced by pulses 99' and 100', and bear no relation to them.

The pulses 112 and 113 represent feed-back from the multivibrator 12, and, accordingly, are advanced or retarded, as indicated by the double arrows 114, simultaneously with the trailing edges 104 and 115 of the voltage D when adjustment is made to the potentiometer 69.

The output of multivibrator 12 is differentiated, amplified and inverted in stage 13 to give a wave form F in Fig. 3, which is delivered to the blocking oscillator 14 to produce the wave form G. Here the discontinuities 115, 116 and 104 of voltage D produce the pulses 118, 119 and 121, respectively, of voltage E, and the latter in turn are amplified and inverted to produce the pulses 122, 123 and 124, respectively, of voltage F. Through the active action of the final stage of blocking oscillator 14, which acts as a cathode follower, the pulses 122 and 124 only have effect in producing the pulses 110 and 108 of the voltage G. The output of blocking oscillator 14 may be examined or may trigger another circuit which produces a pulse for study, but in the circuit illustrated the pulses of voltage G, such as pulse 108, are to be studied.

As stated previously, this pulse is impressed upon the signal receiving circuit of the oscilloscope tube for study, and is swept by the sweep wave output of generator 15 supplied to the tube's deflecting circuit terminals through conductors 18. Since the sweep wave generator is triggered by the trailing edge 100 of wave A, Fig. 4, the useful portion of the sweep wave C will appear as shown at 103. Further, since the on and off time of triggering multivibrator 12, which triggers blocking oscillator 14, can be controlled by varying potentiometer 69, it is possible to vary the trailing edge 104 of wave D with respect to the triggering of the sweep.

Thus, by varying potentiometer 69, the trailing edge of wave D may be made to occur with respect to sweep 103 at the dotted line position 105, in which case blocking oscillator 14 will be triggered to generate a pulse 107 coming before the triggering of sweep 103, and the pulse will not be visible.

Similarly, the trailing edge of wave D may be made to occur as shown at 104 or 106. In the first instance the pulse 108 will be synchronized with the sweep to give full wave indication, which is the desired operation, and in the second case the pulse will occur slightly before the return of the sweep to datum and again only a portion of the pulse will be shown, as indicated at 109.

With the circuit operating as described, it is seen that the sweep and the pulse under study may be synchronized with each other to give full wave indication by a single adjustment, namely that of potentiometer 69.

In the illustrated embodiment of the invention, the unsymmetrical multivibrator 10 is designed to operate at a plurality of frequencies depending on the constants used, and to effect this result, the resistor 41, which is in parallel with element 39 of the voltage dividers 39 and 40, is employed. When the switch 42 is closed, the circuit will operate at an increased frequency, and conversely, when it is open, at a reduced frequency. Inasmuch as the value of the resistor 80 in the blocking oscillator 14 is of critical value, it is necessary, under the frequency changes outlined above, to effect a corresponding change in the value of resistor 80. The switches 42 and 82 and therefore ganged so that the closing of switch 42 effects a similar closing of switch 82, thereby placing the resistor 81 in parallel with resistor 80 which alters the effective value of the latter to correct for the change in frequency caused by the introduction of resistor 41 in the circuit.

While the circuit shown in Fig. 2 shows the use of eight tubes of the triode type, it is to be understood that such is for illustrative purposes only. In actual practice it is possible to combine the differentiating, amplifying and inverting stages 11 and 13 in a tube of a single envelope, and similarly, the individual tubes of multivibrator stages 10 and 12 and the blocking oscillator 14. Under such an arrangement, the number of tubes is reduced by one-half and the application of the invention is made more practical.

These and other modifications are of course possible and may become apparent in view of the foregoing disclosure. Accordingly, the embodiments of the invention herein described and shown in the accompanying drawings are to be considered as illustrative only and the spirit and scope of the invention to be limited solely by the appended claims.

What is claimed is:

1. In a delayed trigger circuit, an unsymmetrical multivibrator, a first wave amplifying and inverting means, a variable width gate generator, a sweep wave generating means, a second wave amplifying and inverting means, a blocking oscillator and a buffer stage, said unsymmetrical multivibrator producing a wave, the trailing edge of which triggers the said sweep generator and the leading edge of which triggers said variable width gate generator to in turn produce a wave, and means associated with said variable width gate generator for controlling the occurrence of the trailing edge of the wave produced by it to come before or after the triggering of said sweep wave generating means to thereby trigger said blocking oscillator in variable time relation with the triggering of said sweep wave generator.

2. In a cathode ray tube indicating device having a signal receiving circuit and a deflection circuit, a pulse generating means for applying a pulse to the signal circuit of said indicating device, a sweep wave generating means for delivering a sweep wave to said deflection circuit, first and second square wave generating means, said first square wave generating means being operable to trigger said sweep wave generating means and said second square wave generating means, the latter being operable in turn to trigger said pulse generator means, and means for controlling the on and off time of said second square wave generating means whereby said pulse generating means may be triggered before or after said sweep wave generating means.

3. In combination with a cathode ray tube indicating device having first and second deflecting circuits, pulse generating means for dellivering a pulse to said first deflecting circuit, a first multivibrator for triggering said pulse generating means, a sweep wave generating means for delivering a sweep to said second deflecting circuit, a second multivibrator for triggering said sweep wave generator and said first multivibrator respectively, and means for varying the on and off time of said first multivibrator whereby the triggering of said pulse generating means may be controlled to come before or after the triggering of said sweep wave generating means.

4. In a blocking oscillator delayed trigger circuit, a wave squaring means, a sweep wave generator, a pulse generator, and a variable trigger circuit for triggering said pulse generator, said variable trigger circuit and said sweep wave generator being successively triggered by said wave squaring means so that said variable trigger circuit is operable to trigger said pulse generator before or after the triggering of said sweep wave generator.

5. A circuit comprising a blocking oscillator, means for triggering said blocking oscillator, control means for governing the on and off time of said blocking oscillator trigger means, a sweep wave generator, and means for producing a square wave, the leading and trailing edges of which sequentially trigger said blocking oscillator triggering means and said sweep wave generator whereby said trigger means is conditioned to be responsive to said control means to effect the triggering of said blocking oscillator either before or after the triggering of said sweep wave generator.

6. In combination, an unsymmetrical multivibrator for generating a first square wave having leading and trailing edges, a second multivibrator synchronized with said first multivibrator to produce a second square wave having its leading edge synchronized with the leading edge of the first square wave, said second multivibrator including an adjustment for varying relative on and off time thereof to vary the time of occurrence of the trailing edge of said second square wave, a sweep wave generating means, a coupling between said first multivibrator and said sweep wave generating means for triggering said sweep wave generating means on the trailing edge of said first square wave, a coupling between said first multivibrator and said second multivibrator for triggering the latter by the leading edge of said first square wave, and a blocking oscillator with a coupling to said second multivibrator for triggering the blocking oscillator on the trailing edge of the wave of said second multivibrator, whereby adjustment of said second multivibrator controls the time of triggering of said blocking oscillator before or after the triggering of said sweep wave generating means.

7. In combination with an oscilloscope, sweep wave generating means, means for generating a pulse, and means for successively triggering said sweep generating means and then said pulse generating means to provide full wave oscilloscopic indication of said pulse.

8. In a delayed trigger circuit, separate means to generate a sweep wave and a pulse, and variable trigger means controlled synchronously with the sweep wave generating means for triggering said pulse generating means after the triggering of said sweep generating means.

9. A circuit comprising means for generating a first square wave, means for generating a pulse, means responsive to said first square wave for generating a sweep wave, and means including a second square wave generating means actuated by said first square wave generating means for controlling the triggering of said pulse generating means with respect to the generation of said sweep wave.

10. The combination of an oscilloscope, a sweep wave generator, a pulse wave generator, separate triggering means for said sweep wave and said pulse wave generators, and means controlled synchronously with the sweep wave generating means for adjustably controlling the triggering of said pulse wave generator before or after the triggering of said sweep wave generator.

SAMUEL SENSIPER.
GILMAN B. ANDREWS.